Aug. 12, 1958  T. J. BOLLING, JR  2,847,238
PIN RETAINER

Filed Dec. 3, 1954  2 Sheets-Sheet 1

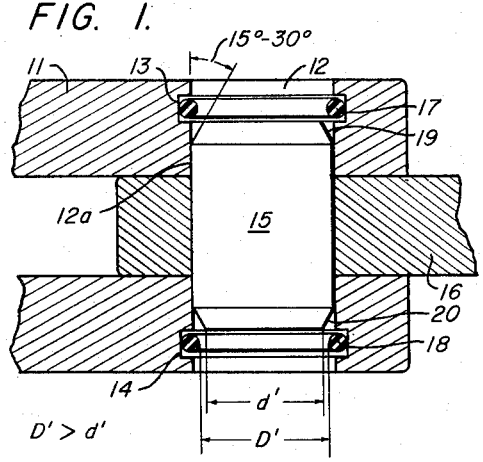

FIG. 1.

$D' > d'$ $D'$ = dia. of area circumscribed by 'o'-ring.
$d'$ = dia. of entry.

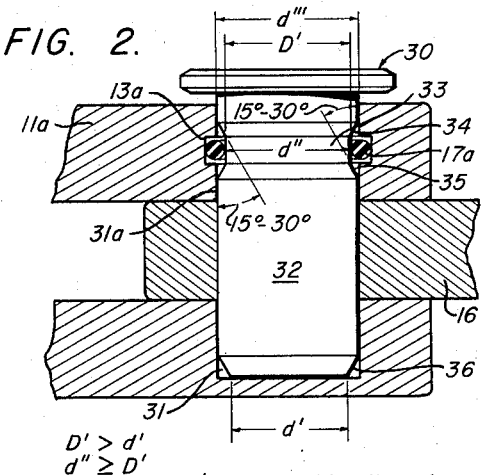

FIG. 2.

$D' > d'$
$d'' \geq D'$
$D' < d'''$ $D'$ = free inside dia. of 'o'-ring.
$d'$ = dia. of entry taper 36.
$d''$ = dia. of 33.
$d'''$ = dia. of entry tapers 35 and 34.

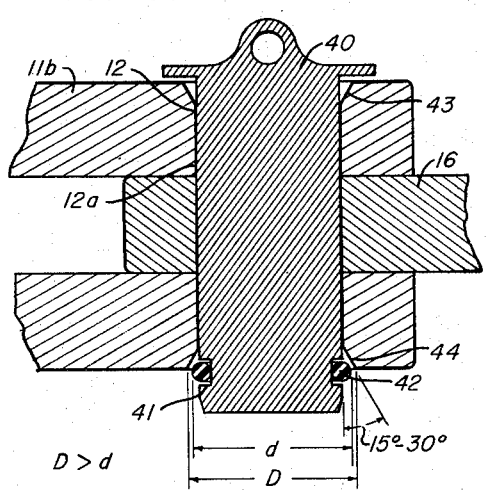

FIG. 3.

$D > d$ $D$ = dia. of entry.
$d$ = dia. of area circumscribed by 'o'-ring.

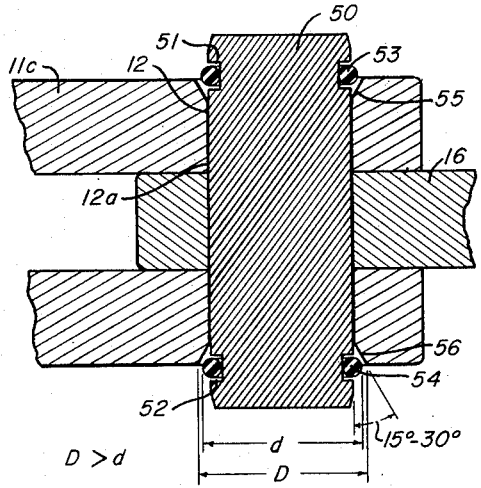

FIG. 4.

$D > d$ $D$ = dia. of entry.
$d$ = dia. of area circumscribed by 'o'-ring.

INVENTOR.
Thomas J. Bolling, Jr.,
BY
ATTORNEY.

Aug. 12, 1958 T. J. BOLLING, JR 2,847,238
PIN RETAINER

Filed Dec. 3, 1954 2 Sheets-Sheet 2

W = area of entry surface.
w = area of 'o'-ring.

INVENTOR.
Thomas J. Bolling, Jr.,
BY
ATTORNEY.

United States Patent Office 2,847,238
Patented Aug. 12, 1958

2,847,238
PIN RETAINER

Thomas J. Bolling, Jr., Houston, Tex., assignor, by mesne assignments, to Esso Research and Engineering Company, Elizabeth, N. J., a corporation of Delaware Application December 3, 1954, Serial No. 472,861

11 Claims. (Cl. 287—110)

The present invention is directed to a pin retainer for use in a housing having an opening. More particularly, the invention is directed to a retainer for pins and the like for use in removably connecting and attaching one member to another. In its more specific aspects, the invention is concerned with a pin retaining member for use in pipe tongs and the like.

The present invention may be briefly described as a retainer for pins and the like which comprises, in combination, a housing having an opening having a first surface. A pin member having a shank defining a second surface is arranged in said opening. The pin member substantially fills the opening and fits snugly therein. At least one rectangular recess is provided in one of the cylindrical surfaces and in the rectangular recess is an annular deformable member having a circular cross section of a diameter greater than the depth of the recess. The recess has sufficient volume to contain the deformable member when it is deformed between the surfaces on insertion of the pin member in the opening. The surface opposite the surface containing the recess has an entry conical surface at each end defining an angle with the longitudinal axis of the pin member between about 15° and about 30°, the diameter of the entry being different from the diameter of the area circumscribed by the operative surface of the deformable member in the recess.

The deformable member may suitably be constructed of natural or synthetic rubber or other elastic materials having rubber properties, such as the characteristic of being deformed. The deformable member has a hardness in the range between 55 and 90 durometer when tested by the ASTM method of test, ASTM Designation: D676–46T.

The present invention is particularly suitable for use in pipe tongs in which a tong jaw is removably or replaceably attached to a tong arm by a pin member of the nature described.

The present invention may be further described by reference to the drawing in which:

Fig. 1 illustrates one embodiment of the invention with a recess in the cylindrical surface of the housing;

Fig. 2 is a modified embodiment of Fig. 1 with a recess in the cylindrical surface of the housing;

Fig. 3 shows a pin member having a recess in the shank of the pin member;

Fig. 4 is a pin member having recesses in both ends of the shank thereof;

Figure 5:
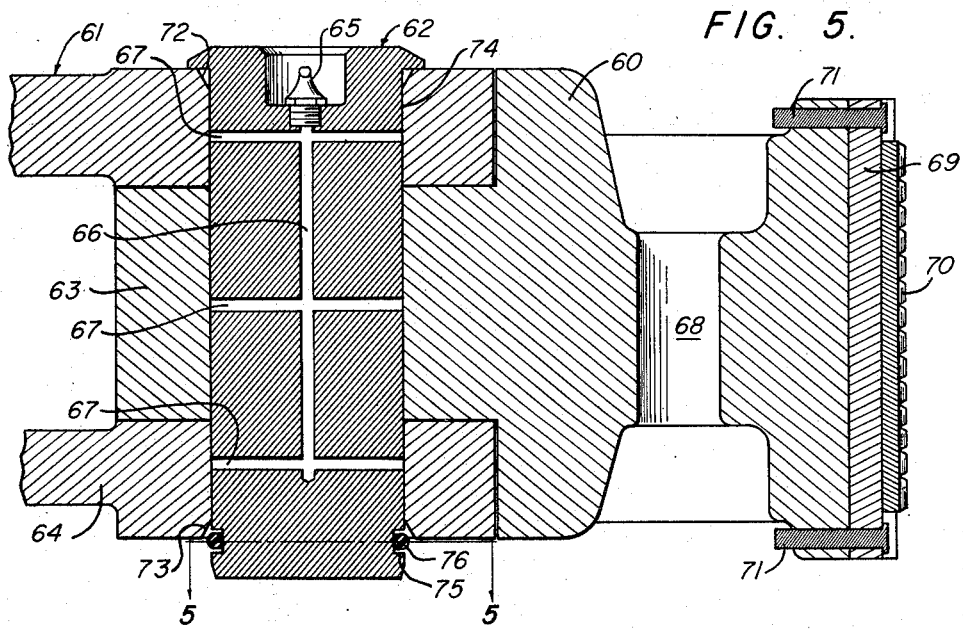
Fig. 5 illustrates application of the invention to a pipe tong.

Referring now to the drawing in which identical numerals will be employed to designate identical parts, in Fig. 1 numeral 11 designates a female yoke, for example, of a pipe tong, having a cylindrical opening 12 which is provided with a first recess 13 in the cylindrical surface 12a and a second recess 14 in the cylindrical surface 12a.

Attached to the female yoke 11 by a removable pin member 15 is a male yoke 16 which is insertable in the female yoke 11. The pin member 15 retains the male yoke 16 in the female yoke 11 by means of the deformable annular members 17 and 18 arranged, respectively, in recesses 13 and 14. The pin member 15 has conical surfaces 19 and 20 at each end thereof which define an angle with the longitudinal axis of the pin member 15 between about 15° and 30°. The diameter of the entry is less than the diameter of the area circumscribed by the deformable member in the recesses.

Referring now to Fig. 2, a female yoke 11a has a male yoke 16 held therein by a pin member 30 which is arranged in the opening 31 of the female yoke 11a, the opening 31 being provided with a cylindrical surface 31a similar to the embodiment of Fig. 1 except that the opening 31 does not extend completely through the female yoke 11 as in Fig. 1. In this instance, the female yoke 11a is provided with a single recess 13a in which a deformable member 17a is arranged.

The pin member 30 is provided with a shank 32 and has a portion of reduced diameter 33 provided with conical surfaces 34 and 35. The lower end of the shank 32 has a third conical surface 36. In this particular instance, the conical surfaces 34, 35 and 36 also define angles with the longitudinal axis of the shank 32 from about 15° to about 30°.

Referring now to Fig. 3, a female yoke 11b has a male yoke 16 held therein by means of a pin member 40 arranged in the cylindrical opening 12. The pin member 40 is provided with a rectangular recess 41 on the lower end thereof in which is arranged a deformable member 42. The female yoke 11b is provided with conical surfaces 43 and 44 at both entries to the cylindrical surface 12a and these conical surfaces define angles from about 15° to about 30° with the longitudinal axis of pin member 40. In the embodiment of Fig. 3, the diameter of the area circumscribed by the deformable member is less than the diameter of the entry taper or surface 44.

In Fig. 4 a female yoke member 11c has a male yoke 16 held therein by means of a pin member 50 which is provided with rectangular recesses 51 and 52 adjacent each end thereof. Arranged in the recesses 51 and 52, respectively, are deformable members 53 and 54. The pin member 50 fits into an opening in the yoke members 11c and 16 having an opening 12 having a cylindrical surface 12a, such as in Figs. 1 and 3.

The female yoke member 11c of Fig. 4 has conical entry surfaces 55 and 56 at each end of the cylindrical surface 12 and these conical surfaces define with the longitudinal axis of the pin member 50 an angle between about 15° and 30°. In the instances of Figs. 3 and 4, the diameter of the entry is greater than the diameter of the area circumscribed by the deformable member in the recesses whereas in Fig. 1 the diameter of the area circumscribed by the deformable members 17 and 18 is greater than the diameter of the entry surfaces 19 and 20.

In Fig. 2, the free inside diameter of the O-ring 17a is the important consideration. Here the free inside diameter of O-ring or deformable members 17a is equal to or slightly less than the diameter of the surface 33. By having the surface 33 larger in diameter than the O-ring 17a, chattering or movement of pin 30 is prevented. The diameter of the entry surface 36 is greater than the free inside diameter of O-ring 17a and the diameters of the entry surfaces 35 and 36 are less than the free inside diameter of the O-ring.

Referring now to Fig. 5, a tong jaw 60 is connected to a tong arm 61 by means of a pin member 62, the tong arm 61 being comprised of a male yoke 63 and a female yoke 64. The pin member 62 is provided with a grease fitting 65 connected to a conduit 66 from which lateral conduits or passageways 67 lead to lubricate the pin 62. The tong jaw 60 has a mud drain hole 68 and is provided with a replaceable die plate 69 to which is attached a tong jaw die 70 by die retaining pins 71. The female yoke 64 has an entry surface 72 and an entry surface 73 defining an angle of about 15° to about 30° with the longitudinal axis of the pin 62. The pin 62 is arranged in the opening 74 in the male and female yokes 63 and 64.

The pin 62 has a rectangular recess 75 in which is arranged a deformable annular member or O-ring 76 which serves to retain the pin in the opening 74 and to attach the tong arm jaw to the tong arm.

The recess 75 is of sufficient size to contain the deformable member 76 when the deformable member 76 is deformed by the surfaces 72 and 73 on insertion and/or removal of the pin 62.

Figure 6:
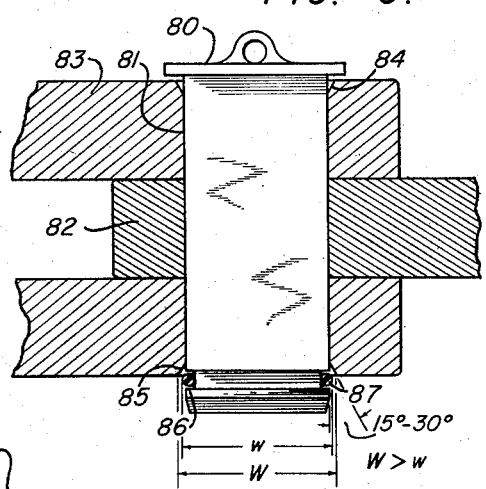
Fig. 6 is a further modification of the invention.
Figure 7:
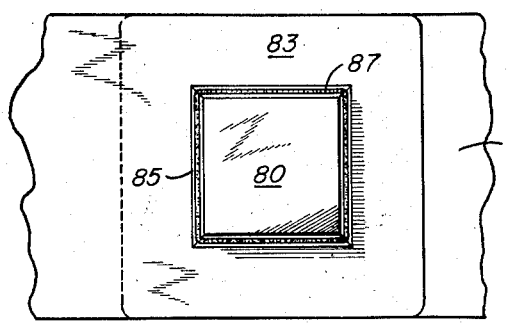
Fig. 7 is a bottom view showing the construction of the device of Fig. 6.

Referring now to Figs. 6 and 7, a square or rectangular pin in a square or rectangular opening is shown in which a pin member 80 is inserted in an opening 81 in the male yoke 82 and the female yoke 83. The female yoke 83 has tapered entry surfaces 84 and 85 at each end which define angles in the range from about 15° to about 30° with the longitudinal axis of the pin member 80.

The pin member 80 has a rectangular recess 86 in which an annular deformable member 87 of circular cross section is arranged therein. The recess 86 is of sufficient size to contain the deformable member but yet let the deformable member protrude therefrom to retain the pin 80 in the opening 81.

It will be seen that the area of the entry surfaces 84 and 85 is greater than the area of the operative surface defined by the O-ring 87 in the recess 86.

The present invention operates in the following manner with respect to Figs. 1 and 2:

In Figs. 1 and 2 the deformable members, such as 17, 18 and 17a would be in the recesses 13, 14 and 13a and the pins 15 and 32 would be placed in the openings 12 and 31. By virtue of the conical surfaces 19 and 20 and 34, 35 and 36, the pins 15 and 30 would deform the deformable members 17, 18 and 17a and squeeze them into their respective recesses allowing the pin members to be inserted into the openings 12 and 31. Once the pin member has moved past the surfaces 12a, the deformable member will assume its undeformed condition and, therefore, act to retain the pin members 15 and 30 in the openings 12 and 31 serving to connect the female yoke 11 and the male yoke 16 and the female yoke 11a and the male yoke 16. With respect to Fig. 3, the deformable member 42, such as an O-ring, would be placed in the recess 41 and the pin member 40 would then be shoved through the opening 12. By virtue of the conical surfaces 43, the deformable member 42 would be deformed and squeezed into the recess 41 which has a volume sufficient to accommodate or contain the deformed deformable member. Once the pin member 40 passes through the opening 12, the deformable member 42 resumes its undeformed condition and serves to retain the pin member 40 in the opening 12. When it is desired to remove the pin 40, the surface 44 causes the deformable member 42 to be squeezed into the recess 41 and the pin member is pulled through the opening 12.

With respect to Fig. 4, the operation is similar with the exception that deformable members are provided on both ends of the pin 50. The conical surfaces squeeze or deform the deformable member into the recesses and allow the pin members to be tapped in or out as may be desired.

Figure 5A:
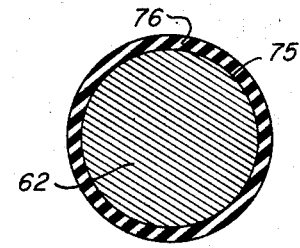
Fig. 5a is a sectional view through line 5—5 of Fig. 5.

A pin member 62 of the tong device of Figs. 5 and 5a is inserted or removed in a similar fashion to the other embodiments of the present invention. For example, with the deformable member 76 in the recess 75, the pin may be shoved through the opening 74 being deformed on entry by the entry surface 72 and squeezed into the recess 75. After the pin has protruded through the opening 74 the deformable member 76 assumes its undeformed condition and retains the pin 62 in the opening 74 and serves to connect the tong arm jaw to the tong arm.

On removing the pin 62, the deformable member 76 would be deformed by the surface 73 and squeezed into recess 75 for removal of the pin member.

The operation of the device of Figs. 6 and 7 is similar to that of the other figures in that the entry surfaces 84 and 85 serve to squeeze the O-ring 87 into the recess 86 such that the pin may be inserted or removed from the opening 81.

The present invention has considerable advantages and utility over the prior art devices in that a deformable member is provided in a recess such that it may be deformed and held in a recess of a sufficient size to accommodate same when a pin member is placed in the opening to accommodate same. The deformable member or O-ring may be snapped in any position either on the pin before insertion in a hole or opening or in a recess in the female member; therefore, by providing a bevel of 15° to about 30° in the approach surface such that the largest diameter of the bevel is greater than the largest diameter of the ring when placed in the recess. This allows the pin to be inserted and/or removed without removing the O-ring whether the recess is in the female housing or in the male pin.

The recess has a depth less than the cross-sectional diameter of the O-ring and is of sufficient volume so that the O-ring or deformable member may flow into and be contained by the recess when the pin is inserted or removed from the housing into which it is inserted.

The feature of the present invention is of great utility essentially in confined areas where it is impossible to secure a pin by insertion of a cotter key or other fastening means of the prior art. In accordance with the present invention, the annular deformable member is placed in the recess wherein it is to act to retain a pin member in a housing.

The invention has many applications and uses to and in machine parts where there is only a radial thrust and no or substantially little end thrust, and where the weight of the pin serves to hold the pin in place.

The nature and objects of the present invention having been completely described and illustrated, what I wish to claim as new and useful and to secure by Letters Patent is:

1. A retainer for pins and the like which comprises, in combination, a housing having an opening defining a first surface, a pin member having a shank defining a second surface arranged in said opening, said pin member substantially filling said opening, at least one rectangular recess in only one of said surfaces, an annular continuous, deformable member in said recess having a circular cross section of a diameter greater than the depth of said recess, said recess having sufficient volume to contain said deformable member when deformed between said surfaces on insertion of said pin member in said opening, the surface opposite the surface containing said recess having an entry conical surface defining an angle with the longitudinal axis of the pin member between about 15° and about 30°, the diameter of the entry being different from the diameter of the area circumscribed by the operative surface of said deformable member in said recess.

2. A retainer in accordance with claim 1 in which the deformable member is natural rubber.

3. A retainer in accordance with claim 1 in which the deformable member is synthetic rubber.

4. A retainer for pins and the like which comprises, in combination, a housing having an opening defining a first cylindrical surface, a pin member having a shank defining a second cylindrical surface arranged in said opening, said pin member substantially filling said opening, at least one rectangular recess in only one of said cylindrical surfaces, an annular, continuous, deformable member in said recess having a circular cross section of a diameter greater than the depth of said recess, said recess having sufficient volume to contain said deformable member when deformed between said cylindrical surfaces on insertion of said pin member in said opening, the cylindrical surface opposite the surface containing said recess having an entry conical surface defining an angle with the longitudinal axis of the pin member between about 15° and about 30°, the diameter of the entry being different from the diameter of the area circumscribed by the operative surface of said deformable member in said recess.

5. A retainer for pins and the like which comprises, in combination, a housing having an opening defining a first cylindrical surface, a pin member having a shank defining a second cylindrical surface arranged in said opening, said pin member substantially filling said opening, at least one rectangular recess in said first cylindrical surface, an annular, continuous, deformable member in said recess having a circular cross section of a diameter greater than the depth of said recess, said recess having sufficient volume to contain said deformable member when deformed between said cylindrical surfaces on insertion of said pin member in said opening, the second cylindrical surface of said pin member having an entry conical surface defining an angle with the longitudinal axis of the pin member between about 15° and about 30°, the diameter of the entry being greater than the diameter of the area circumscribed by the operative surface of said deformable member in said recess.

6. A retainer for pins and the like which comprises, in combination, a housing having an opening extending therethrough defining a first cylindrical surface, a pin member having a shank defining a second cylindrical surface arranged in said opening, said pin member substantially filling said opening, at least one rectangular recess in only one of said cylindrical surfaces, an annular, continuous, deformable member in said recess having a circular cross section of a diameter greater than the depth of said recess, said recess having sufficient volume to contain said deformable member when deformed between said cylindrical surfaces on insertion of said pin member in said opening, the cylindrical surface opposite the cylindrical surface containing said recess having an entry conical surface defining an angle with the longitudinal axis of the pin member between about 15° and about 30°, the diameter of the entry being greater than the diameter of the area circumscribed by the operative surface of said deformable member in said recess.

7. A retainer for pins and the like which comprises, in combination, a housing having an opening extending therethrough defining a first cylindrical surface, a pin member having a shank defining a second cylindrical surface arranged in said opening, said pin member substantially filling said opening, a rectangular recess in said second cylindrical surfaces, an annular, continuous, deformable member in said recess having a circular cross section of a diameter greater than the depth of said recess, said recess having sufficient volume to contain said deformable member when deformed between said cylindrical surfaces on insertion of said pin member in said opening, the first cylindrical surface in said housing having an entry conical surface at each longitudinal end thereof defining an angle with the longitudinal axis of the pin member between about 15° and about 30°, the diameter of the entry being greater than the diameter of the area circumscribed by the operative surface of said deformable member in said recess.

8. A retainer for pins and the like which comprises, in combination, a housing having an opening extending therethrough defining a first cylindrical surface, a pin member having a shank defining a second cylindrical surface arranged in said opening, said pin member substantially filling said opening, at least one rectangular recess in said first cylindrical surface, an annular, continuous, deformable member in said recess having a circular cross section of a diameter greater than the depth of said recess, said recess having sufficient volume to contain said deformable member when deformed between said cylindrical surfaces on insertion of said pin member in said opening, the second cylindrical surface of said pin member having an entry conical surface at each end defining an angle with the longitudinal axis of the pin member between about 15° and about 30°, the diameter of the entry being less than the diameter of the area circumscribed by the operative surface of said deformable member in said recess.

9. In combination with a pipe tong, a tong arm having an opening extending therethrough defining a first cylindrical surface, a pin member having a shank defining a second cylindrical surface arranged in said opening, said pin member substantially filling said opening, at least one rectangular recess in only one of said cylindrical surfaces, an annular, continuous, deformable member in said recess having a circular cross section of a diameter greater than the depth of said recess, said recess having sufficient volume to contain said deformable member when deformed between said cylindrical surfaces on insertion of said pin member in said opening, the cylindrical surface opposite the cylindrical surface containing said recess having an entry conical surface at each end defining an angle with the longitudinal axis of the pin member between about 15° and about 30°, the diameter of the entry being different from the diameter of the area circumscribed by the operative surface of said deformable member in said recess, and a replaceable tong jaw removably attached to said tong arm by said pin member.

10. A retainer for pins and the like which comprises, in combination, a housing having an opening defining a first rectangular surface, a pin member having a shank defining a second rectangular surface arranged in said opening, said pin member substantially filling said opening, at least one rectangular recess in only one of said rectangular surfaces, an annular, continuous, deformable member in said recess having a circular cross section of a diameter greater than the depth of said recess, said recess having sufficient volume to contain said deformable member when deformed between said rectangular surfaces on insertion of said pin member in said opening, the rectangular surface opposite the surface containing said recess having an entry conical surface defining an angle with the longitudinal axis of the pin member between about 15° and about 30°, the diameter of the entry being different from the diameter of the area circumscribed by the operative surface of said deformable member in said recess.

11. A retainer for pins and the like which comprises, in combination, a housing having an opening defining a first rectangular surface, a pin member having a shank defining a second rectangular surface arranged in said opening, said pin member substantially filling said opening, at least one rectangular recess in said first rectangular surface, an annular, continuous, deformable member in said recess having a circular cross section of a diameter greater than the depth of said recess, said recess having sufficient volume to contain said deformable member when deformed between said rectangular surfaces on insertion of said pin member in said opening, the second rectangular surface of said pin member having an entry conical surface defining an angle with the longitudinal axis of the pin member between about 15° and about 30°, the diameter of the entry being greater than the diameter of the area circumscribed by the operative surface of said deformable member in said recess.

(References on following page)

References Cited in the file of this patent

UNITED STATES PATENTS

| | | |
|---|---|---|
| 738,503 | Waters | Sept. 8, 1903 |
| 1,572,770 | Colley | Feb. 9, 1926 |
| 1,774,347 | Bainton | Aug. 26, 1930 |
| 2,255,217 | Hill | Sept. 9, 1941 |
| 2,322,949 | Lux | June 29, 1943 |
| 2,456,355 | Aber | Dec. 14, 1948 |
| 2,678,853 | Reeder | May 18, 1954 |
| 2,704,681 | Fischer | Mar. 22, 1955 |

FOREIGN PATENTS

| | | |
|---|---|---|
| 851,146 | France | Sept. 25, 1939 |
| 543,733 | Great Britain | Mar. 10, 1942 |
| 1,066,843 | France | Jan. 27, 1954 |